(12) United States Patent
Ghazisaeedi et al.

(10) Patent No.: US 10,348,632 B2
(45) Date of Patent: Jul. 9, 2019

(54) TRAFFIC STEERING

(71) Applicant: Nokia Solutions and Networks Oy, Espoo (FI)

(72) Inventors: Ebrahim Ghazisaeedi, Ottawa (CA); Rajesh Kumar Paida, Kanata (CA); Ehsan Rezaaifar, Kanata (CA); Hamid Ould-Brahim, Kanata (CA)

(73) Assignee: Nokia Solutions and Networks Oy, Espoo (FI)

( * ) Notice: Subject to any disclaimer, the term of this patent is extended or adjusted under 35 U.S.C. 154(b) by 19 days.

(21) Appl. No.: 15/836,484

(22) Filed: Dec. 8, 2017

(65) Prior Publication Data

US 2019/0182166 A1    Jun. 13, 2019

(51) Int. Cl.
*H04L 12/815* (2013.01)
*H04L 12/803* (2013.01)
*H04L 12/26* (2006.01)
*H04L 12/721* (2013.01)
*H04L 12/911* (2013.01)

(52) U.S. Cl.
CPC ............. *H04L 47/22* (2013.01); *H04L 43/10* (2013.01); *H04L 45/12* (2013.01); *H04L 47/125* (2013.01); *H04L 47/825* (2013.01)

(58) Field of Classification Search
CPC ......... H04L 47/22; H04L 45/12; H04L 43/10; H04L 47/125; H04L 47/825
See application file for complete search history.

(56) References Cited

U.S. PATENT DOCUMENTS

2002/0145981 A1* 10/2002 Klinker .............. H04L 41/0816
  370/244
2008/0025218 A1*  1/2008 Liu .......................... H04L 47/10
  370/235

(Continued)

OTHER PUBLICATIONS

Kohavi, R. et al., "Practical Guide to Controlled Experiments on the Web: Listen to Your Customers Not to the HiPPO," KDD 2007, Aug. 12-15, 2007, San Jose, CA, 9 pages.

(Continued)

*Primary Examiner* — Afshawn M Towfighi
(74) *Attorney, Agent, or Firm* — Tong, Rea, Bentley & Kim, LLC

(57) ABSTRACT

The present disclosure discloses improvements in computer performance for supporting traffic steering based on a traffic steering capability. The traffic steering capability may be configured to support steering of traffic of a traffic flow, to be supported by a provider core network, along an end-to-end path between a source ingress provider edge router of the provider core network and a destination outside of the provider core network based on determination of the end-to-end path for the traffic flow (e.g., based on end-to-end path performance measurement information that includes internal path performance measurement information of potential internal paths of the provider core network and external path performance measurement information of potential external paths outside of the provider core network) and programming of the provider core network to support steering of the traffic of the traffic flow onto the end-to-end path for the traffic flow (e.g., based on various types of network programming capabilities).

21 Claims, 7 Drawing Sheets

(56) References Cited

U.S. PATENT DOCUMENTS

2014/0016474 A1* 1/2014 Beheshti-Zavareh ........................
  H04L 47/283
  370/236
2015/0304206 A1* 10/2015 Filsfils .................... H04L 45/04
  709/238
2018/0270161 A1* 9/2018 Popescu ................ H04L 43/106

OTHER PUBLICATIONS

Greenberg, A. et al., "The Cost of a Cloud: Research Problems in Data Center Networks," ACM SIGCIMM Computer Communication Review, vol. 39, No. 1, Jan. 2009, 6 pages.

* cited by examiner

TRAFFIC STEERING

TECHNICAL FIELD

The present disclosure relates generally to communication networks and, more particularly but not exclusively, to improvements in computer performance for traffic steering in communication networks.

BACKGROUND

In many communication networks, various combinations of communications technologies may be employed to support end-to-end communication of data.

SUMMARY

The present disclosure generally discloses improvements in computer performance in communication systems, including improvements in computer performance for traffic steering in communication networks. The improvements in computer performance for traffic steering in communication networks may be applied to a provider core network (PCN), including an ingress provider edge (PE) device and a set of egress border routers (EBs), configured to support communications to various destinations via peer networks.

In at least some embodiments, an apparatus is configured to improve computer performance for controlling traffic steering in a communication network. The apparatus includes a processor and a memory communicatively connected to the processor. The processor is configured to receive a request to support a traffic flow to be transported to a destination via a PCN including a source ingress PE device and a set of egress BRs associated with the source ingress PE device. The processor is configured to determine, for each of the egress BRs, end-to-end path performance measurement information (PMI) including internal path PMI for potential internal paths between the source PE device and the respective egress BR and external path PMI for potential external paths between the respective egress BR and the destination. The processor is configured to determine, based on the end-to-end path PMI, an end-to-end path for the traffic flow. The processor is configured to initiate programming of the PCN to support steering of traffic of the traffic flow onto the end-to-end path for the traffic flow. In at least some embodiments, a computer-readable storage medium stores instructions which, when executed by a computer, cause the computer to perform a corresponding method for improving computer performance for controlling traffic steering in a communication network. In at least some embodiments, a corresponding method for improving computer performance for controlling traffic steering in a communication network is provided.

In at least some embodiments, an apparatus is configured to improve computer performance for supporting traffic steering in a communication network. The apparatus includes a processor and a memory communicatively connected to the processor. The processor is configured to receive, by a source ingress PE device of a PCN, a performance measurement test instruction configured to cause the source ingress PE device to initiate a performance measurement test configured to determine performance measurement information for a potential path between the source ingress PE device and an egress BR of the PCN. The processor is configured to receive, by the source ingress PE device, traffic steering rules configured to cause the source ingress PE device to steer traffic of a traffic flow toward the egress BR. In at least some embodiments, a computer-readable storage medium stores instructions which, when executed by a computer, cause the computer to perform a corresponding method for improving computer performance for supporting traffic steering in a communication network. In at least some embodiments, a corresponding method for improving computer performance for supporting traffic steering in a communication network is provided.

In at least some embodiments, an apparatus is configured to improve computer performance for supporting traffic steering in a communication network. The apparatus includes a processor and a memory communicatively connected to the processor. The processor is configured to receive, by an egress BR of a PCN, a performance measurement test message of a first performance measurement test configured to determine performance measurement information for a path between a source ingress PE device of the PCN and the egress BR. The processor is configured to receive, by the egress BR, a performance measurement test instruction configured to cause the egress BR to initiate a second performance measurement test configured to determine performance measurement information for a path between the egress BR and a destination reachable from the PCN via the egress BR. In at least some embodiments, a computer-readable storage medium stores instructions which, when executed by a computer, cause the computer to perform a corresponding method for improving computer performance for supporting traffic steering in a communication network. In at least some embodiments, a corresponding method for improving computer performance for supporting traffic steering in a communication network is provided.

In at least some embodiments, an apparatus is configured to improve computer performance for supporting traffic steering in a communication network. The apparatus includes a processor and a memory communicatively connected to the processor. The processor is configured to receive, by a destination reachable from a PCN via an egress BR of the PCN, a performance measurement test instruction configured to cause the destination to create a testing probe. The processor is configured to receive, by the destination from the egress BR based on the testing probe, a performance measurement test message of a performance measurement test configured to determine performance measurement information for a path between the egress BR and the destination. In at least some embodiments, a computer-readable storage medium stores instructions which, when executed by a computer, cause the computer to perform a corresponding method for improving computer performance for supporting traffic steering in a communication network. In at least some embodiments, a corresponding method for improving computer performance for supporting traffic steering in a communication network is provided.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure generally discloses improvements in computer performance in communication systems, including improvements in computer performance for supporting traffic steering in communication networks based on a traffic steering capability. The traffic steering capability may be configured to support steering of traffic of a traffic flow to be supported by a provider core network. The traffic steering capability may be configured to support steering of traffic of the traffic flow along an end-to-end path between a source ingress provider edge router of the provider core network and a destination located outside of the provider core network via an egress border router of the provider core network, such that the end-to-end path includes an internal path portion within the provider core network (e.g., from the source ingress provider edge router to the egress border router) and an external path portion that is outside of the provider core network (from the egress border router to the destination). The traffic steering capability may be configured to support steering of traffic of the traffic flow based on determination of the end-to-end path for the traffic flow and programming of the provider core network to support steering of the traffic of the traffic flow onto the end-to-end path for the traffic flow. The traffic steering capability may be configured to support the determination of the end-to-end path for the traffic flow based on end-to-end path performance measurement information that includes internal path performance measurement information associated with potential internal paths of the provider core network and external path performance measurement information associated with potential external paths from the provider core network to the destination. The traffic steering capability may be configured to support the determination of the end-to-end path for the traffic flow based on end-to-end path performance measurement information that includes, for each of one or more egress border routers which are potential egress points from the provider core network for the destination, internal path performance measurement information associated with potential internal paths from the source ingress provider edge router to the respective potential egress border router and external path performance measurement information associated with potential external paths from the respective potential egress border router to the destination. The traffic steering capability may be con-figured to perform programming of the provider core network to support steering of the traffic of the traffic flow onto the end-to-end path for the traffic flow based on various types of network programming capabilities. It will be appreciated that these and various other embodiments and potential advantages of the traffic steering capability may be further understood by way of reference to the example communication system of FIG. 1.

Figure 1:
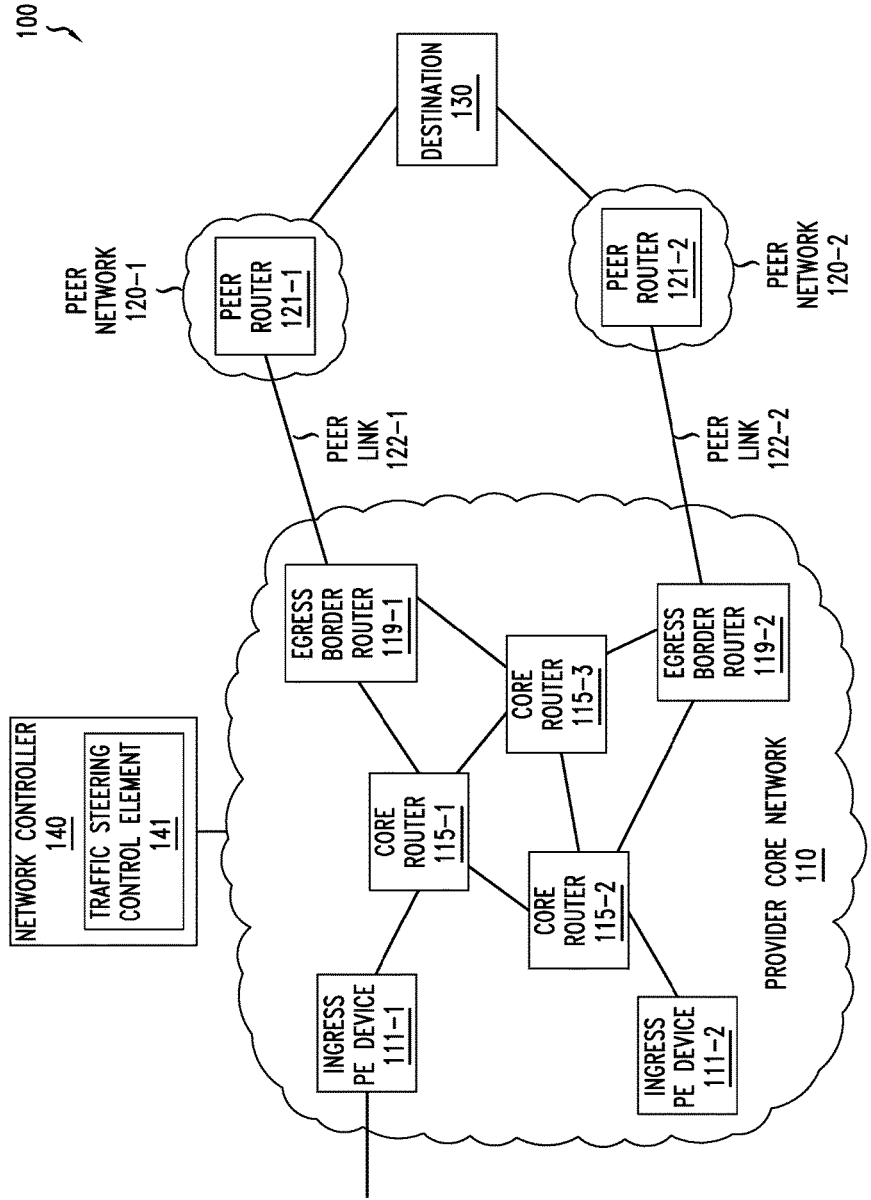
FIG. 1 depicts an example communication system for illustrating traffic steering for a provider core network based on end-to-end path performance measurement information.

FIG. 1 depicts an example communication system for illustrating traffic steering for a provider core network based on end-to-end path performance measurement information.

The communication system 100 includes a provider core network (PCN) 110, two peer networks (PNs) 120-1 and 120-2 (collectively, PNs 120) configured to peer with PCN 110, a destination 130 accessible via the PNs 120, and a network controller (NC) 140 configured to provide control functions for the PCN 110.

The PCN 110 may be based on various communications technologies. The PCN 110 may support various data plane technologies and capabilities (e.g., elements, protocols, or the like, as well as various combinations thereof), control plane technologies and capabilities (e.g., elements, protocols, or the like, as well as various combinations thereof), or the like, as well as various combinations thereof. For example, the PCN 110 may be based on one or more of Internet Protocol (IP), Multiprotocol Label Switching (MPLS), or the like, as well as various combinations thereof. For example, the PCN 110 may support Border Gateway Protocol (BGP) and other control protocols. The PCN 110 may be implemented as a Software Defined Network (SDN). The PCN 110 may be based on various other types of communication technologies.

The PCN 110 includes a set of ingress PE devices 111-1-111-2 (collectively, ingress PE devices 111). The ingress PE devices 111 may be routers, switches, or other suitable types of PE devices. The ingress PE devices 111 may be controlled by NC 140. It is noted that the ingress PE devices 111 are referred to as ingress devices as the description primarily considers traffic flows proceeding in a direction from the PCN 110 toward the PNs 120 and destination 130 (such that the ingress PE devices 111 are ingress points into the PCN 110 for the traffic flows); however, it will be appreciated that traffic may flow in both directions (and, thus, that, for traffic flows proceeding in a direction to the core provider network 110 from the PNs 120, the ingress PE devices 111 may be referred to as egress PE devices or egress peer nodes). The ingress PE devices 111 may be configured to support various functions for supporting traffic steering within PCN 110, at least some of which are discussed further herein and presented with respect to FIGS. 2 and 4. It will be appreciated that, although omitted for purposes of clarity, the PCN 110 may include more than two ingress PE devices 111.

The PCN 110 includes a set of egress border routers (BRs) 119-1-119-2 (collectively, egress BRs 119). The egress BR 119-1 is a border router that is connected to the PN 120-1 via an egress peer link. The egress BR 119-2 is a border router that is connected to the PN 120-2 via an egress peer link. The egress BRs 119 may be considered to be autonomous system BRs (ASBRs) as these routers may be operating at the border between networks that are operating as separate autonomous systems. The egress BRs 119 may be controlled by NC 140. It is noted that the egress BRs 119 are referred to as egress devices as the description primarily considers traffic flows proceeding in a direction from the PCN 110 toward the PNs 120 and destination 130 (such that the BRs 119 are egress points from PCN 110 for the traffic flows);

however, it will be appreciated that traffic may flow in both directions (and, thus, that, for traffic flows proceeding in a direction to the PCN 110 from the PNs 120, the egress BRs 119 may be referred to as ingress BRs or ingress PE devices). The egress BRs 119 may be configured to support various functions for supporting traffic steering within PCN 110, at least some of which are discussed further herein and presented with respect to FIGS. 2 and 5. It will be appreciated that, although omitted for purposes of clarity, the PCN 110 may include more than two egress BRs 119.

The PCN 110 includes a set of core devices (CDs) 115-1-115-3 (collectively, CDs 115). The CDs 115 are configured to operate as the core of the PCN 110, supporting communications between the various edge devices of the provider core network (e.g., supporting communications from ingress PE devices 111 to egress BRs 119 for traffic flowing in a direction from the PCN 110 toward the PNs 120 and destination 130).

The PCN 110 is configured to support communication of traffic across the PCN 110. The PCN 110 is configured to support communication of data from the ingress PE devices 111 to the egress BRs 119 via the CRs 115. The PCN 110 may be configured to support communication of data from the ingress PE devices 111 to the egress BRs 119 via the CRs 115 based on shortest path routing (e.g., along shortest paths within PCN 110), based on use of traffic steering to steer traffic of traffic flows (e.g., along paths of the PCN 110 that might not otherwise be selected based on shortest path routing), or the like, as well as various combinations thereof. The various edge devices (e.g., ingress PE devices 111 and egress BRs 119) and core devices (e.g., CDs 115) within the PCN 110 may be connected to each other using various types of communication links. The various edge devices (e.g., ingress PE devices 111 and egress BRs 119) within the PCN 110 may be connected to each other via various core devices (e.g., CDs 115) within the PCN 110 (e.g., connections between ingress PEs 111 and egress BRs 119 via CDs 115) using various types of network connections, such as Label Switched Paths (LSPs) or other suitable types of network connections.

The PCN 110 is configured to support various capabilities for supporting control of traffic steering within PCN 110. The PCN 110 may be configured to support control of traffic steering within PCN 110 based on use of egress peer engineering within the PCN 110, based on support of various functions for supporting end-to-end path computation for controlling traffic steering within PCN 110, based on support of various functions for supporting determination of end-to-end path performance measurement information which may be used in path computations for controlling traffic steering within PCN 110, based on support of various functions for supporting programming of the PCN 110 to support traffic steering within PCN 110, or the like, as well as various combinations thereof.

The PCN 110 may be configured to support control of traffic steering within PCN 110 based on use of egress peer engineering within the PCN 110. In general, egress peer engineering is a network use case in which an ingress device (e.g., an ingress PE device 111) is instructed to use a specific egress border router (e.g., an egress BR 119) and, potentially, a specific external interface (e.g., a particular egress peer link from an egress BR 119) to reach a particular destination (e.g., destination 130). The egress peer engineering capabilities of PCN 110 may be based on a routing protocol, such as the Border Gateway Protocol (BGP) or other suitable type of protocol. The egress peer engineering capabilities of PCN 110 may be based on Segment Routing (SR) route advertisement. For example, the egress peer engineering capabilities of PCN 110 may be provided using one or more of Segment Routing Egress Peer Engineering BGP-LS Extensions (BGP-LS-EPE), Segment Routing Centralized Egress Peer Engineering (SR-EPE), or the like, as well as various combinations thereof. The PCN 110 may be configured, based on egress peer engineering, such that each of the ingress PE devices 111 has a peering relationship with each of the egress BRs 119 (e.g., one being a primary egress peer node and the other being an alternate egress peer node) and, thus, such that the destination 130 is reachable via both of the egress BRs 119. It will be appreciated that, where EPE is based on BGP, the egress BRs 119 may be considered to be egress BGP peers nodes.

The PCN 110 may be configured to support control of traffic steering within PCN 110 based on support of various functions configured to perform end-to-end path computation for controlling traffic steering within PCN 110 and based on support of various functions configured to determine end-to-end path performance measurement information which may be used in path computations for controlling traffic steering within PCN 110. For example, the PCN 110 may be configured to support use of a shortest path algorithm (e.g., Dijkstra's algorithm or other suitable shortest path algorithm) for end-to-end path computation for controlling traffic steering within PCN 110. For example, the PCN 110 (e.g., ingress PE devices 111, egress BRs 119, or the like) may be configured to support determination of end-to-end path performance measurement information based on use of various performance measurement tests (e.g., LSP Ping, Internet Control Message Protocol (ICMP) Ping, the Two-Way Interactive Measurement (TWAMP) protocol, or the like, as well as various combinations thereof) for use in end-to-end path computation. The PCN 110 may be configured to support various other capabilities for supporting end-to-end path computation for controlling traffic steering within PCN 110.

The PCN 110 may be configured to support control of traffic steering within PCN 110 based on support of various functions configured for programming the PCN 110 to support traffic steering within PCN 110. For example, the PCN 110 may be configured to support path provisioning based on use of capabilities configured to support programming of traffic steering rules within the PCN 110. For example, PCN 110 may be configured to support programming of traffic steering rules within PCN 110 based on one or more of OpenFlow, BGP (e.g., using one or more of BGP FlowSpec, BGP route injection, or the like), programmable Application Programming Interfaces (APIs), steering filters, Resource Reservation Protocol (RSVP), or the like, as well as various combinations thereof. The PCN 110 may be configured to support various other capabilities for supporting programming of the PCN 110 to support traffic steering within PCN 110.

The PCN 110 may include various other elements and communication links, which have been omitted from FIG. 1 for purposes of clarity. The PCN 110 may be configured to support various other functions and capabilities, which have been omitted from FIG. 1 for purposes of clarity.

The PNs 120 are communication networks that are configured to support communications of PCN 110 and destination 130. The PNs 120 are configured to peer with PCN 110. The PNs 120 may be based on various communications technologies. For example, the peer networks may be IP networks, IP/MPLS networks, Ethernet networks, or the like, as well as various combinations thereof. The PNs 120 may support various data plane technologies and capabilities (e.g., elements, protocols, or the like, as well as various combinations thereof), control plane technologies and capabilities (e.g., elements, protocols, or the like, as well as various combinations thereof), or the like, as well as various combinations thereof. The PNs 120 may be based on various other communications technologies. The PNs 120 may include various types of networks (e.g., operator networks, Internet Service Provider (ISP) networks, data center networks, content delivery networks (CDNs), or the like).

The PNs 120, as noted above, are communication networks that are configured to support communications of PCN 110 and destination 130. The PNs 120-1 and 120-2 include peer routers 121-1 and 121-2 (collectively, peer routers 121), respectively. The peer routers 121-1 and 121-2 of the PNs 120-1 and 120-2 are connected to the egress BRs 119-1 and 119-2 of the PCN 110 via egress peer links 122-1 and 122-2 (collectively, egress peer links 122), respectively. The peer routers 121 may be ingress PE devices configured to operate as ingress points into the PNs 120, from the egress BRs 119 of the PCN 110, for traffic flows that are flowing in a direction from the provider core 110 to the PNs 120. The PNs 120 may be configured to transport the traffic flows received from the egress BRs 119 for delivery to the intended destination(s) of the traffic flows (illustratively, destination 130). It will be appreciated that, although omitted from FIG. 1 for purposes clarity, the PNs 120 each may include various other network elements (e.g., routers, switches, controllers, or the like), communication links, or the like, as well as various combinations thereof.

The PNs 120 may be configured to support various capabilities for supporting determination of end-to-end path performance measurement information which may be used in path computations for controlling traffic steering within PCN 110. For example, the PNs 120 may be configured to support determination of end-to-end path performance measurement information based on use of various performance measurement tests (e.g., LSP Ping, ICMP Ping, the TWAMP protocol, or the like, as well as various combinations thereof). The PNs 120 may be configured to support various other capabilities for supporting determination of end-to-end path performance measurement information which may be used in path computations for controlling traffic steering within PCN 110.

It will be appreciated that, although primarily presented herein with respect to use of two PNs 120 to support communications of PCN 110 and communications of destination 130, fewer or more PNs 120 may be used to support communications of PCN 110 and communications of destination 130.

The destination 130 may be any destination which may receive traffic from the PCN 110 via the PNs 120. The destination 130 may be a device, a subset, a network, or the like. The destination 130 may be associated with a customer of the provider of the PCN 110, a customer of one of the PNs 120, or the like. The destination 130 may be associated with a private data network (e.g., an enterprise network, a data center network, or the like). The destination 130 may be a network element or end user element. The destination 130 may be configured to support various functions for supporting determination of end-to-end path performance measurement information which may be used in end-to-end path computations by PCN 110, at least some of which are discussed further herein and presented with respect to FIGS. 2 and 6. For example, the destination 130 may be configured to support use of a local probe in order to support determination of end-to-end path performance measurement information. For example, the destination 130 may be configured to support determination of end-to-end path performance measurement information based on use of LSP Ping, ICMP Ping, the TWAMP protocol, or the like, as well as various combinations thereof. The destination 130 may be configured to support various other capabilities for supporting determination of end-to-end path performance measurement information which may be used in path computations by the PCN 110. It will be appreciated that, although omitted for purposes of clarity, many other destinations 130 may be reachable via the PCN 110 and PNs 120.

The NC 140 is configured to provide control functions for PCN 110. The NC 140 is configured to control traffic steering for traffic flows traversing PCN 110. The NC 140 is configured to control steering of traffic of a traffic flow based on determination of an end-to-end path for the traffic flow and programming of the PCN 110 to support steering of the traffic of the traffic flow onto the end-to-end path for the traffic flow. The NC 140 may be configured to support the determination of the end-to-end path for the traffic flow based on end-to-end path performance measurement information that includes internal path performance measurement information associated with potential internal paths of the PCN 110 and external path performance measurement information associated with potential external paths from the PCN 110 to the destination 130. The NC 140 may be configured to perform programming of the PCN 110 to support steering of the traffic of the traffic flow onto the end-to-end path for the traffic flow based on various types of network programming capabilities. The NC 140 may include a traffic steering control element 141 configured to provide various functions of the traffic steering capability. The NC 140 may be configured to provide various other control functions for PCN 110. It will be appreciated that the operation of the NC 140 in controlling traffic steering within the PCN 110 may be further understood by way of reference to FIGS. 2 and 3.

The NC 140, as noted above, is configured to control traffic steering for traffic flows traversing PCN 110. The NC 140 is configured to receive a request for a path for a traffic flow to the destination 130, determine an end-to-end path for the traffic flow to the destination 130, and program the PCN 110 to support steering of traffic of the traffic flow to the destination 130 onto the end-to-end path for the traffic flow to the destination 130.

The NC 140 may be configured to control traffic steering for traffic of the traffic flow to the destination 130 responsive to the request for the path for the traffic flow to the destination 130. The request for the path for the traffic flow to the destination 130 may be received from any suitable source of such a request (e.g., from a source of the traffic flow, from a source of the traffic flow within the PCN 110 (e.g., one of the ingress PE devices 111 that receives the request or receives a first packet of the traffic flow), from a management system, or the like). The traffic flow for which the path is requested may be any type of traffic flow which may be transported via the PCN 110 (e.g., a video flow transporting video traffic, a voice flow transporting voice traffic, a data flow transporting data traffic, or the like. The end-to-end path that is determined for the traffic flow to the destination 130 will be a path between one of the ingress PE devices 111 that is a source ingress PE device 111 into the PCN 110 for the traffic flow and the destination 130, including an internal path or internal path portion (a portion of the end-to-end path that is within the PCN 110, between the source ingress PE device 111 into the PCN 110 for the traffic flow and one of the egress BRs 119 selected as a selected egress BR 119 out of the PCN 110 for the traffic flow) and an external path or external path portion (a portion of the end-to-end path that is external to the PCN 110, between the selected egress BR 119 and the destination 130).

The NC 140 is configured to determine the end-to-end path for the traffic flow to the destination 130 using a path computation algorithm based on end-to-end path performance measurement information.

The NC 140 is configured to obtain the end-to-end path performance measurement information for use in computing the end-to-end path using the path computation algorithm.

The NC 140 may be configured to obtain end-to-end path performance measurement information for each of the egress BRs 119 via which the destination 130 is accessible, as each of the egress BRs 119 via which the destination 130 is accessible is a potential candidate for selection as the selected egress BR 119 for the end-to-end path. The NC 140 may determine each of the egress BRs 119 via which the destination 130 is accessible based on egress peer engineering information associated with the source ingress PE device 111 of the traffic flow.

The end-to-end path performance measurement information may include internal performance measurement information for the internal path portion of the end-to-end path (e.g., internal performance measurement information associated with potential internal paths within the PCN 110) and external performance measurement information for the external path portion of the end-to-end path (e.g., external performance measurement information associated with potential external paths between the PCN 110 and the destination 130 via the PNs 120).

The internal performance measurement information associated with potential internal paths within the PCN 110 may include, for each of the egress BRs 119 via which the destination 130 is accessible, performance measurement information for potential internal paths of the PCN 110 which could be selected for the traffic flow based on selection of that respective egress BR 119 as the egress point for the traffic flow (e.g., any potential paths of the PCN 110 between the source ingress PE device 111 and the respective egress BR 119). The internal performance measurement information associated with potential internal paths within the PCN 110 may be obtained in various ways. For example, the internal performance measurement information associated with potential internal paths within the PCN 110 may be obtained based on use of various performance measurement tests (e.g., LSP Ping, ICMP Ping, or the like). The various performance measurement tests may be initiated by the NC 140 for causing elements of PCN 110 to perform the performance measurement tests and report associated performance measurement results to the NC 140. For example, the NC 140 may instruct the source ingress PE device 111 to initiate various performance measurement tests for collecting performance measurement information for various potential internal paths from the source ingress PE device 111 to the egress BRs 119 via which the destination 130 is accessible. In the PCN 110, for example, the NC 140 may instruct the source ingress PE device 111 to perform a set of pings for each of the potential internal paths between the source ingress PE device 111 and the egress BR 119-1 and to perform a set of pings for each of the potential internal paths between the source ingress PE device 111 and the egress BR 119-2. For example, the NC 140 may instruct the egress BRs 119 via which the destination 130 is accessible to initiate various performance measurement tests for collecting performance measurement information for various potential internal paths between the source ingress PE device 111 and the egress BRs 119 via which the destination 130 is accessible. For example, the NC 140 may obtain at least a portion of the internal performance measurement information from one or more external systems. The potential internal paths of the PCN 110 for which performance measurement information is collected may include existing paths of the provider core network (e.g., LSPs or other paths), paths created within the PCN 110 on-demand (e.g., under the control of the NC 140), or the like, as well as various combinations thereof. The potential internal paths of the PCN 110 for which performance measurement information is collected may include internal end-to-end paths between the source ingress provider PE device 111 and the associated egress BR 119 of the PCN 110, internal paths composed of serial concatenations of paths within the provider code network (e.g., an end-to-end path between the source ingress provider PE device 111 and the associated egress BR 119 that is composed of a first path from the ingress provider PE device 111 to a CR 115 and a second path from the CR 115 to the associated egress BR 119), or the like, as well as various combinations thereof. It will be appreciated that various combinations of such capabilities may be employed by NC 140 to obtain internal performance measurement information associated with potential internal paths within the PCN 110.

The external performance measurement information associated with potential external paths outside of the PCN 110 may include, for each of the egress BRs 119 via which the destination 130 is accessible, performance measurement information for potential external paths outside of the PCN 110 which could be selected for the traffic flow based on selection of that respective egress BR 119 as the egress point for the traffic flow (e.g., any potential paths between the respective egress BR 119 and the destination 130). The external performance measurement information associated with potential external paths outside of the PCN 110 may be obtained in various ways. For example, the external performance measurement information associated with potential external paths outside of the PCN 110 may be obtained based on use of various performance measurement tests (e.g., ICMP Ping, TWAMP, or the like). The use of various performance measurement tests may be initiated by the NC 140. The network controller may initiate use of various performance measurement tests by sending performance measurement test instructions to various elements for causing the performance measurement tests to be performed and the associated performance measurement results to be reported to the NC 140. For example, the NC 140 may instruct each of the egress BRs 119 via which the destination 130 is accessible to initiate various performance measurement tests for collecting performance measurement information for various potential external paths between the respective egress BRs 119 and the destination 130. In the PCN 110, for example, the NC 140 may instruct the egress BR 119-1 to perform a set of pings for each of the potential external paths between the egress BR 119-1 and the destination 130 and may instruct the egress BR 119-2 to perform a set of pings for each of the potential external paths between the egress BR 119-2 and the destination 130. For example, the NC 140 may instruct a peer router 121 of a PN 120 associated with the destination to instruct the destination 130 to initiate various performance measurement tests for collecting performance measurement information for various potential external paths between the egress BR 119 and the destination 130. For example, the NC 140 may instruct the destination 130 to initiate various performance measurement tests for collecting performance measurement information for various potential external paths between the egress BR 119 and the destination 130. For example, the NC 140 may instruct an external controller with access to the destination 130 to instruct the destination 130 to initiate various performance measurement tests for collecting performance measurement information for various potential external paths between the egress BR 119 and the destination 130. For example, the NC 140 may obtain at least a portion of the external performance measurement information from one or more external systems. In at least some embodiments, in which collection of external performance measurement information for various potential external paths between the egress BR 119 and the destination 130 is based on use of a testing address at the destination 130, the NC 140 may be configured to determine the testing address at the destination based on one or more of use of an analytics engine that collects flow stats, use of route controller devices that provide performance data based on measurements from one or more egress BRs 119 to the destination address, or the like, as well as various combinations thereof. In at least some embodiments, in which collection of external performance measurement information for various potential external paths between the egress BR 119 and the destination 130 is based on use of a testing probe at the destination 130, the NC 140 may initiate creation of the testing probe at the destination 130 and may initiate performance measurement testing for various potential external paths between the egress BR 119 and the destination 130 based on the testing probe at the destination 130 (e.g., by sending one or more performance measurement testing instructions to one or more elements as discussed above). It will be appreciated that various combinations of such capabilities may be employed by the NC 140 to obtain external performance measurement information associated with potential external paths outside of the PCN 110.

The performance measurement information that is collected by the NC 140 may include various types of performance measurement information. For example, the performance measurement information may include latency information, packet loss information, jitter information, or the like, as well as various combinations thereof. It will be appreciated that these types of performance measurement information may be obtained for the internal performance measurement information and/or for the external performance measurement information and, thus, may be included within the end-to-end path performance measurement information that is used for computing the path for the traffic flow.

The NC 140 is configured to determine the end-to-end path for the traffic flow to the destination 130. The NC 140 is configured to determine the end-to-end path for the traffic flow to the destination 130 based on the end-to-end path performance measurement information collected by the NC 140. The NC 140 is configured to determine the end-to-end path for the traffic flow to the destination 130 using a path computation algorithm that takes as input the end-to-end path performance measurement information. The path computation algorithm may be a shortest path algorithm (e.g., Dijkstra's algorithm or any other suitable shortest path algorithm). The determination of the end-to-end path may include identification of the internal path portion of the end-to-end path within the provider core network (from the source ingress PE device 111 to the egress BR 119 via which the traffic flow will exit the PCN 110). The determination of the end-to-end path may include identification of an egress point from the PCN 110 for the traffic flow. The identification of an egress point from the PCN 110 for the traffic flow may include (1) an identification of one of the egress BRs 119 via which the traffic flow will exit the PCN 110, (2) an identification of one of the egress BRs 119 via which the traffic flow will exit the PCN 110 and an identification of an associated peer router 120 that is associated with the one of the egress BRs 119 via which the traffic flow will exit the PCN 110, or (3) an identification of one of the egress BRs 119 via which the traffic flow will exit the PCN 110, an identification of an associated peer router 120 that is associated with the one of the egress BRs 119 via which the traffic flow will exit the PCN 110, and an identification of a peer link 122 between the one of the egress BRs 119 via which the traffic flow will exit the PCN 110 and the associated peer router 120 that is associated with the one of the egress BRs 119 via which the traffic flow will exit the PCN 110. The end-to-end path, depending one various factors (e.g., the type of performance measurement information collected, the path computation algorithm, that is used, one or more requirements or goals for the traffic flow, or the like) may be a lowest latency path, a path having the least amount of packet drops, a path having the least jitter, a path selected based on a combination of such considerations, or the like. The NC 140 may be configured to support various other functions configured for use in determining the end-to-end path for the traffic flow to the destination 130.

The NC 140 is configured to control programming of the PCN 110 to support steering of traffic of the traffic flow onto the end-to-end path for the traffic flow. The NC 140 is configured to control programming of the PCN 110 to support steering of traffic of the traffic flow onto the end-to-end path for the traffic flow by controlling programming of the source ingress PE device 111 for the traffic flow to support steering of traffic of the traffic flow onto the end-to-end path for the traffic flow. The NC 140 is configured to initiating programming of the source ingress PE device 111 to support steering of traffic of the traffic flow onto the end-to-end path for the traffic flow by programming the source ingress PE device 111 for the traffic flow with instructions to forward traffic of the traffic flow toward an egress point of the PCN 110 for the traffic flow. The egress point of the PCN 110 for the traffic flow, as discussed above, may include one or more of the egress BRs 119 via which the traffic flow will exit the PCN 110, an associated peer router 120 that is associated with the one of the egress BRs 119 via which the traffic flow will exit the PCN 110, or a peer link 122 between the one of the egress BRs 119 via which the traffic flow will exit the PCN 110 and the associated peer router 120 that is associated with the one of the egress BRs 119 via which the traffic flow will exit the PCN 110. The NC 140 may be configured to initiate programming of the PCN 110 to support steering of traffic of the traffic flow onto the end-to-end path for the traffic flow based on at least one of an OpenFlow protocol, configuration of a steering filter, configuration of a BGP Flowspec protocol, use of a programmable API of a RIB or a FIB, use of BGP route injection, or the like, as well as various combinations thereof. The NC 140 may be configured to support various other functions configured for use in controlling programming of the PCN 110 to support steering of traffic of the traffic flow onto the end-to-end path for the traffic flow.

The NC 140 may be configured to maintain topology information associated with the PCN 110. The topology information may include internal connections between elements of the PCN 110 (e.g., between various combinations of the ingress PE devices 111, CRs 115, and egress BRs 119), which may be discovered by the NC 140 using various topology discovery capabilities. The topology information may include information or assumptions about external connections associated with the PCN 110 (e.g., external logical connections between egress BRs 119 and external destinations such as destination 130). It is noted that a combination of these types of topology information may be considered to provide an abstract topology for the NC 140. The NC 140 may use the topology information to collect path performance measurement information, to compute end-to-end paths using path computation algorithms, to program PCN 110 to support traffic steering, or the like, as well as various combinations thereof.

The NC 140 may be configured to provide various other functions for supporting control over traffic steering for the PCN 110.

The NC 140 may be implemented in various ways. For example, where the PCN 110 is implemented as an SDN, the NC 140 may be implemented as an SDN controller configured to control PCN 110 based on SDN control capabilities. For example, where the PCN 110 is not implemented as an SDN, the NC 140 may be implemented as a management system or server configured to control PCN 110 based on management control capabilities. The NC 140 may be implemented in various other ways.

It will be appreciated that, while embodiments of the traffic steering capability are primarily presented herein within the context of a communication system that includes specific numbers, types, and arrangements of networks and elements and capabilities of those networks, various embodiments of the traffic steering capability may be provided within the context of communication systems using other numbers, types, and/or arrangements of networks (and/or elements of those networks, capabilities of those networks, or the like, as well as various combinations thereof).

Figure 2:
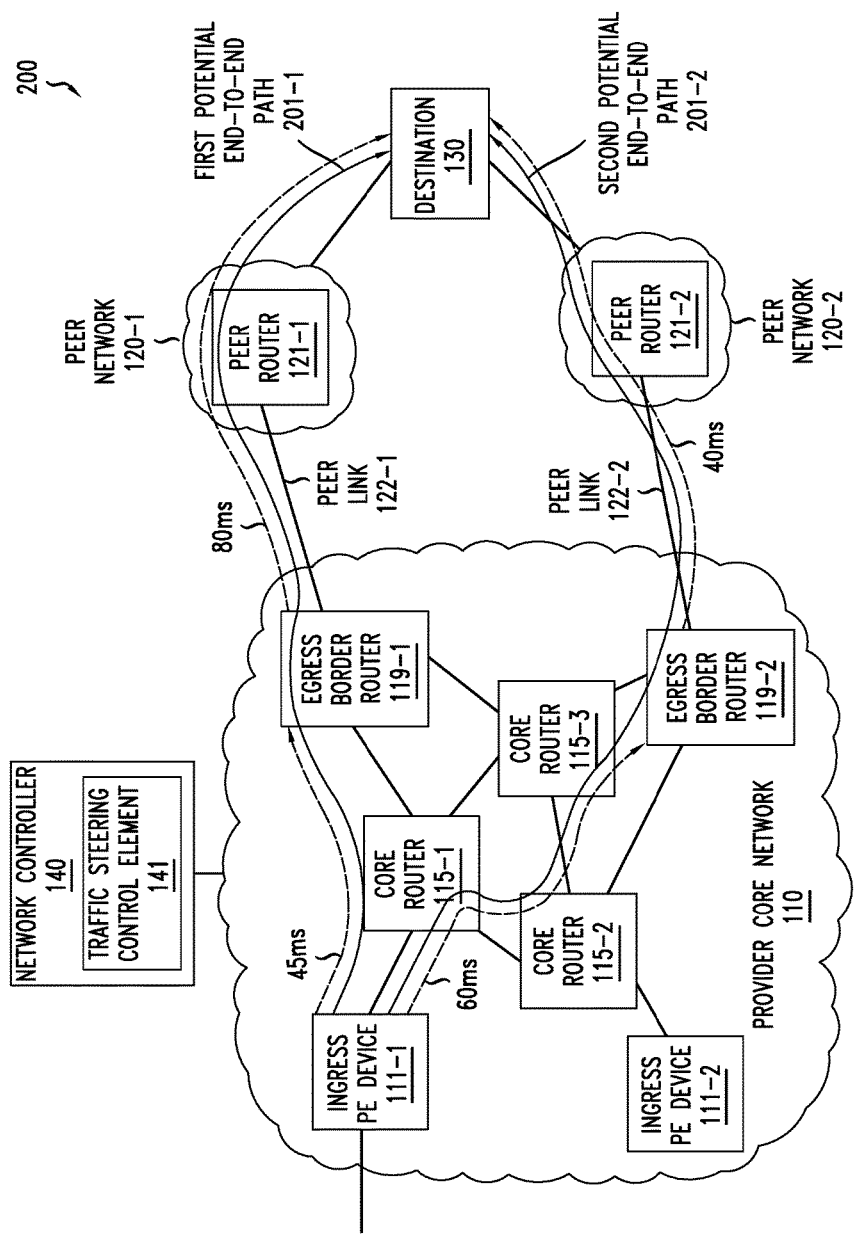
FIG. 2 depicts an example of traffic steering for a traffic flow within the example communication system of FIG. 1.

FIG. 2 depicts an example of traffic steering for a traffic flow within the example communication system of FIG. 1.

The example 200 of FIG. 2 is based on the example communication system 100 of FIG. 1.

The NC 140 receives a request to support a traffic flow to destination 130. The traffic flow ingresses into the PCN 110 via ingress PE device 111-1 such that the ingress PE device 111-1 is the source ingress PE device 111 for the traffic flow.

The NC 140 determines that the destination 130 is reachable via each of the egress BRs 119. The network controller 130 identifies two potential end-to-end paths 201 for the traffic flow. The first potential end-to-end path 201-1 is a path from the source ingress PE device 111-1 to the destination 130 via the egress BR 119-1 and PN 120-1, and includes an internal path portion from the source ingress PE device 111-1 to the egress BR 119-1 and an external path portion from the egress BR 119-1 to the destination 130. The second potential end-to-end path 201-2 is a path from the source ingress PE device 111-1 to the destination 130 via the egress BR 119-2 and PN 120-2, and includes an internal path portion from the source ingress PE device 111-1 to the egress BR 119-2 and an external path portion from the egress BR 119-2 to the destination 130. It will be appreciated that, although two potential end-to-end paths 201 are presented for purposes of clarity, many potential end-to-end paths 201 may be available between the source ingress PE device for the traffic flow and the intended external destination of the traffic flow.

The NC 140 collects performance measurement information for the potential end-to-end paths 201. For example, the NC 140 collects performance measurement information for first potential end-to-end path 201-1 and determines that the overall latency of the first potential end-to-end path 201-1 is 125 ms, with the latency of the internal path portion of the first potential end-to-end path 201-1 being 45 ms and the latency of the external path portion of the first potential end-to-end path 201-1 being 80 ms. Similarly, for example, the NC 140 collects performance measurement information for second potential end-to-end path 201-2 and determines that the overall latency of the second potential end-to-end path 201-2 is 100 ms, with the latency of the internal path portion of the f second potential end-to-end path 201-2 being 60 ms and the latency of the external path portion of the second potential end-to-end path 201-2 being 40 ms.

The NC 140 executes a path computation algorithm using the performance measurement information for the potential end-to-end paths 201 and selects the second potential end-to-end path 201-2, rather than the first potential end-to-end path 201-1, as the end-to-end path for the traffic flow as the second potential end-to-end path 201-2 has a lower latency than the first potential end-to-end path 201-1. It will be appreciated that, in the absence of the traffic steering capabilities, the NC 140 would only have visibility within the PCN 110 and thus, would have selected the internal path portion of the first potential end-to-end path 201-1, rather than the internal path portion of the second potential end-to-end path 201-1, as the path for the traffic flow (since the latency of the internal path portion of the first potential end-to-end path 201-1 (i.e., 45 ms) is less than the latency of the internal path portion of the second potential end-to-end path 201-1 (i.e., 60 ms).

The NC 140 then initiates provisioning of the PCN 110 to steer traffic of the traffic flow to the second potential end-to-end path 201-2. For example, the network controller may program the source ingress PE device 111-1 with traffic steering instructions for causing the source ingress PE device 111-1 to steer traffic of the traffic flow toward the egress BR 119-2 associated with the second potential end-to-end path 201-2 that has been selected as the end-to-end path for the traffic flow. In this manner, the traffic steering control capability enables steering of traffic flows away from end-to-end paths on which they otherwise would have been sent and onto end-to-end paths that are better-suited, end-to-end, for transporting traffic of the traffic flows to the intended destinations.

Figure 3:
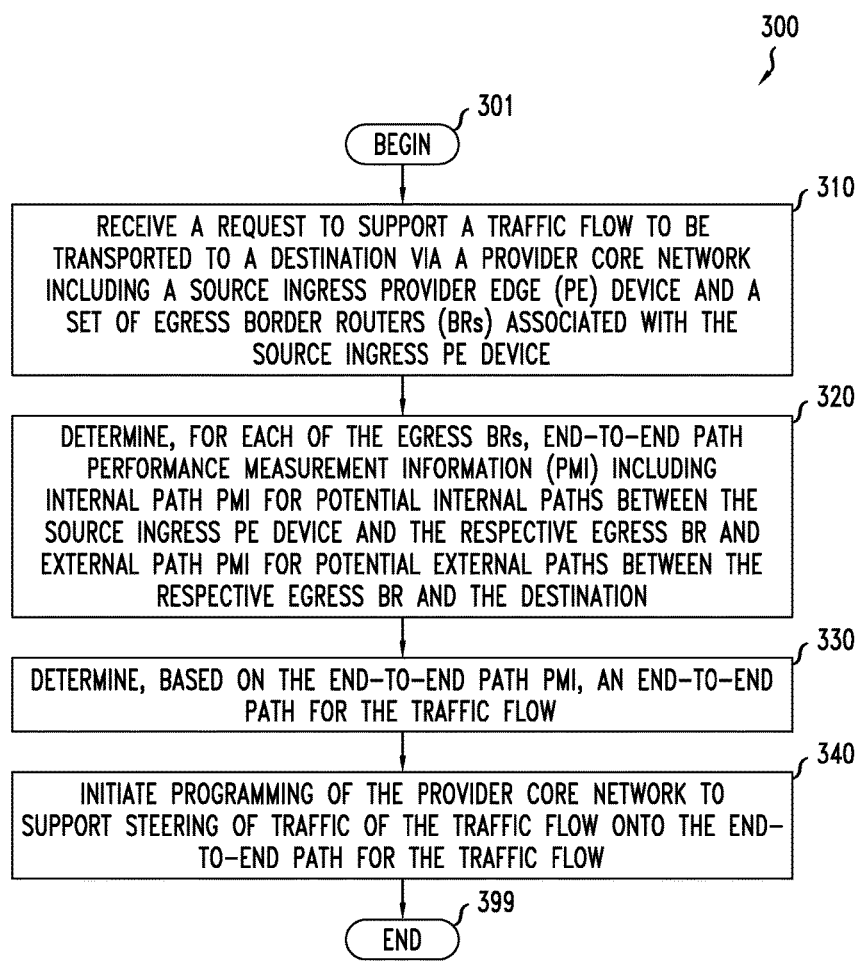
FIG. 3 depicts an example of a method for use by a network controller of a provider core network to control traffic steering for the provider core network based on end-to-end path performance measurement information.

FIG. 3 depicts an example of a method for use by a network controller of a provider core network to control traffic steering for the provider core network based on end-to-end path performance measurement information. The method 300 of FIG. 3 may be further understood by way of reference to FIG. 1 and FIG. 2. It will be appreciated that, although primarily presented herein as being performed serially, at least a portion of the functions of method 300 may be performed contemporaneously or in a different order than as presented in FIG. 3. At block 301, method 300 begins. At block 310, receive a request to support a traffic flow to be transported to a destination via a PCN including a source ingress PE device and a set of egress BRs associated with the source ingress PE device. At block 320, determine, for each of the egress BRs, end-to-end path performance measurement information (PMI) including internal path PMI for potential internal paths between the source PE device and the respective egress BR and external path PMI for potential external paths between the respective egress BR and the destination. At block 330, determine, based on the end-to-end path PMI, an end-to-end path for the traffic flow. At block 340, initiate programming of the PCN to support steering of traffic of the traffic flow onto the end-to-end path for the traffic flow. At block 399, method 300 ends.

Figure 4:
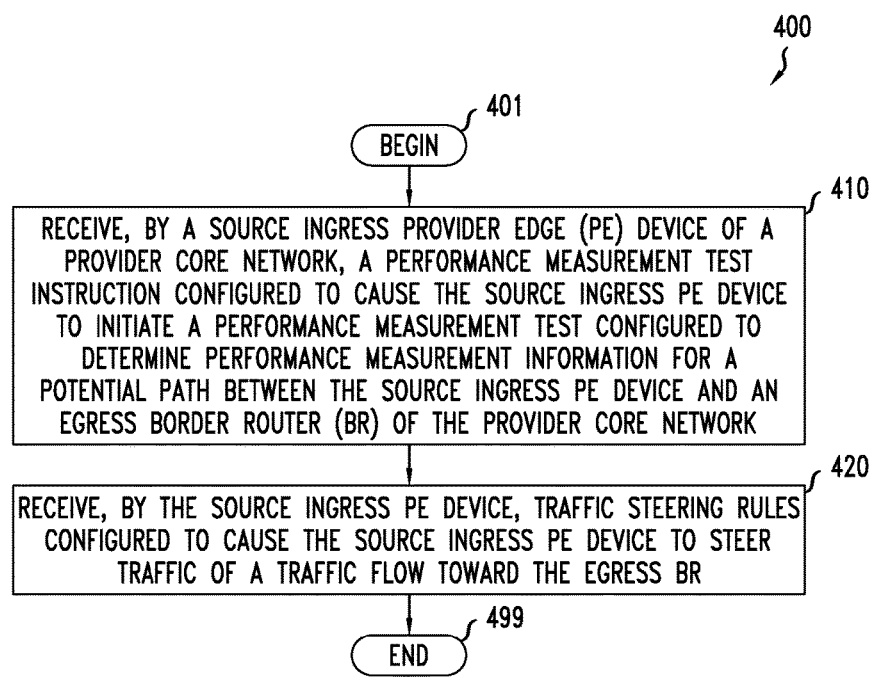
FIG. 4 depicts an example of a method for use by a source ingress provider edge device of a provider core network to support traffic steering for the provider core network.

FIG. 4 depicts an example of a method for use by a source ingress provider edge device of a provider core network to support traffic steering for the provider core network. The method 400 of FIG. 4 may be further understood by way of reference to FIG. 1 and FIG. 2. It will be appreciated that, although primarily presented herein as being performed serially, at least a portion of the functions of method 400 may be performed contemporaneously or in a different order than as presented in FIG. 4. At block 401, method 400 begins. At block 410, receive, by a source ingress PE device of a PCN, a performance measurement test instruction configured to cause the source ingress PE device to initiate a performance measurement test configured to determine performance measurement information for a potential path between the source ingress PE device and an egress border router (BR) of the provider core network. At block 420, receive, by the source ingress PE device, traffic steering rules configured to cause the source ingress PE device to steer traffic of a traffic flow toward the egress BR. At block 499, method 400 ends.

Figure 5:
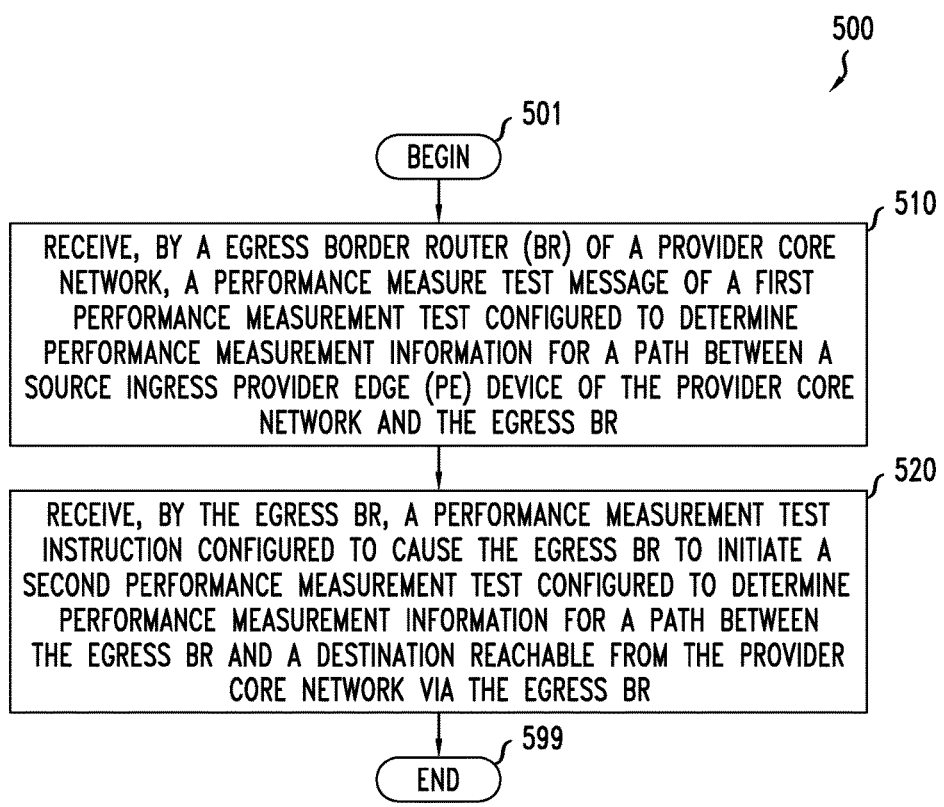
FIG. 5 depicts an example of a method for use by an egress border router of a provider core network to support collection of end-to-end path performance measurement information for use in performing traffic steering for the provider core network.

FIG. 5 depicts an example of a method for use by an egress border router of a provider core network to support collection of end-to-end path performance measurement information for use in traffic steering for the provider core network. The method 500 of FIG. 5 may be further understood by way of reference to FIG. 1 and FIG. 2. It will be appreciated that, although primarily presented herein as being performed serially, at least a portion of the functions of method 500 may be performed contemporaneously or in a different order than as presented in FIG. 5. At block 501, method 500 begins. At block 510, receive, by an egress BR of a PCN, a performance measurement test message of a first performance measurement test configured to determine performance measurement information for a path between a source ingress PE device of the PCN and the egress BR. At block 520, receive, by the egress BR, a performance measurement test instruction configured to cause the egress BR to initiate a second performance measurement test configured to determine performance measurement information for a path between the egress BR and a destination reachable from the PCN via the egress BR. At block 599, method 500 ends.

Figure 6:
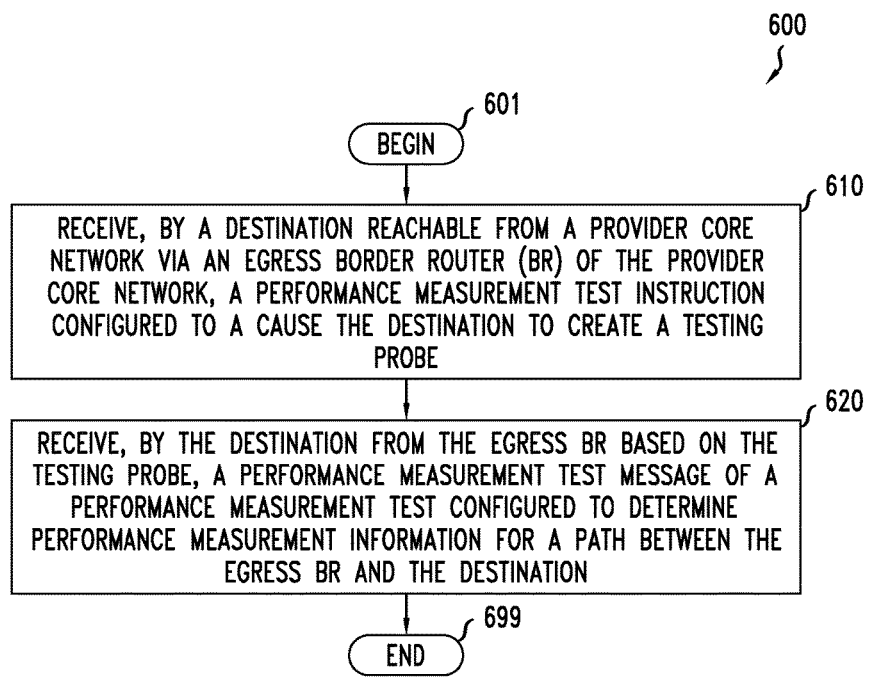
FIG. 6 depicts an example of a method for use by a destination reachable via a provider core network to support collection of end-to-end path performance measurement information for use in traffic steering for the provider core network.

FIG. 6 depicts an example of a method for use by a destination reachable via a provider core network to support collection of end-to-end path performance measurement information for use in traffic steering for the provider core network. The method 600 of FIG. 6 may be further understood by way of reference to FIG. 1 and FIG. 2. It will be appreciated that, although primarily presented herein as being performed serially, at least a portion of the functions of method 600 may be performed contemporaneously or in a different order than as presented in FIG. 6. At block 601, method 600 begins. At block 610, receive, by a destination reachable from a PCN via an egress BR of the PCN, a performance measurement test instruction configured to cause the destination to create a testing probe. At block 620, receive, by the destination from the egress BR based on the testing probe, a performance measurement test message of a performance measurement test configured to determine performance measurement information for a path between the egress BR and the destination. At block 699, method 600 ends.

It will be appreciated that various embodiments of the traffic steering capability may provide various capabilities or advantages. In at least some embodiments, for example, the traffic steering capability may be configured to provide peer engineering (e.g., SDN peer engineering) based on performance-based measurements, traffic steering, and path computation. In at least some embodiments, for example, the traffic steering capability may be configured to provide an ability to dynamically select an egress border router and peer for selected traffic flows to specific destinations based on measured end-to-end performance information. In at least some embodiments, for example, the traffic steering capability may be configured to optimize on a combination of internal path performance (e.g., MPLS/IGP path performance) and external path performance (e.g., BGP routes over ISPs or other public networks), thereby providing full end-to-end performance measurement based optimization. In at least some embodiments, for example, the traffic steering capability may be configured to support traffic steering based on real-time analytics per traffic flow or application on peering, automatic real-time probing from each source ingress PE and each egress BR, path computation based on abstract topology information to determine one or more ASBRs for each traffic flow, and auto-steering of selected IP flows/routes when the best end-to-end path is found. In at least some embodiments, for example, the traffic steering capability may be configured to minimize end-to-end latency of traffic from a PE router to a destination subnet via real-time latency measurements and optimized traffic flow steering, thereby ensuring that traffic destined to a user goes through the shortest path after entering the PE router. In at least some embodiments, for example, the traffic steering capability may be configured to combine real-time latency measurement data with path computation to select the best egress BR using automatic and dynamic steering of traffic flows via SDN tools to achieve the optimum end-to-end latency for selected flows. It is noted that various embodiments of the traffic steering capability may provide various other capabilities or advantages.

Figure 7:
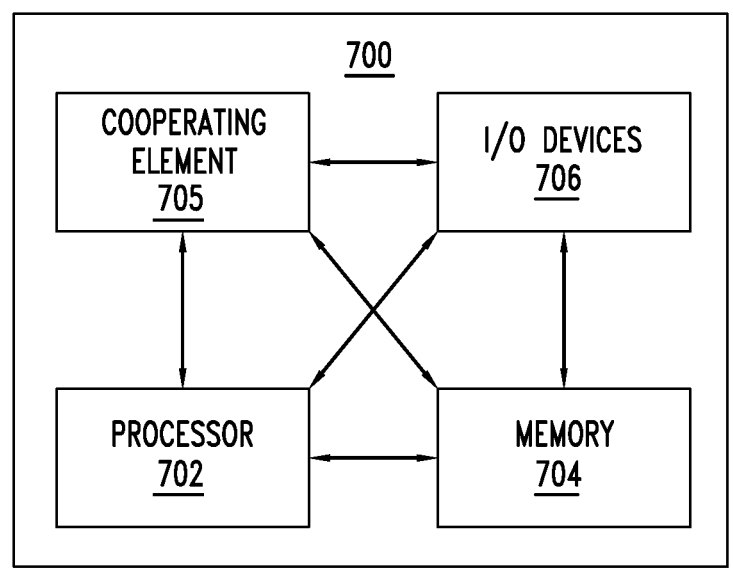
FIG. 7 depicts a high-level block diagram of a computer suitable for use in performing various functions presented herein.

FIG. 7 depicts a high-level block diagram of a computer suitable for use in performing various functions described herein.

The computer 700 includes a processor 702 (e.g., a central processing unit (CPU), a processor having a set of processor cores, a processor core of a processor, or the like) and a memory 704 (e.g., a random access memory (RAM), a read only memory (ROM), or the like). The processor 702 and the memory 704 are communicatively connected.

The computer 700 also may include a cooperating element 705. The cooperating element 705 may be a hardware device. The cooperating element 705 may be a process that can be loaded into the memory 704 and executed by the processor 702 to implement functions as discussed herein (in which case, for example, the cooperating element 705 (including associated data structures) can be stored on a non-transitory computer-readable storage medium, such as a storage device or other storage element (e.g., a magnetic drive, an optical drive, or the like)).

The computer 700 also may include one or more input/output devices 706. The input/output devices 706 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 700 of FIG. 7 may represent a general architecture and functionality suitable for implementing functional elements described herein, portions of functional elements described herein, or the like, as well as various combinations thereof. For example, computer 700 may provide a general architecture and functionality that is suitable for implementing one or more elements presented herein.

It will be appreciated that the functions depicted and described herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits (ASIC), and/or any other hardware equivalents).

It will be appreciated that at least some of the functions discussed herein as software methods may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus configured to improve computer performance in controlling traffic steering, the apparatus comprising:
   a processor and a memory communicatively connected to the processor, the processor configured to:
      receive a request to support a traffic flow to be transported to a destination via a provider core network including a source ingress provider edge (PE) device and a set of egress border routers (BRs) associated with the source ingress PE device;
      determine, for each of the egress BRs, end-to-end path performance measurement information (PMI) including internal path PMI for potential internal paths between the source PE device and the respective egress BR and external path PMI for potential external paths between the respective egress BR and the destination;
      determine, based on the end-to-end path PMI, an end-to-end path for the traffic flow; and
      initiate programming of the provider core network to support steering of traffic of the traffic flow onto the end-to-end path for the traffic flow.

2. The apparatus of claim 1, wherein the destination includes a destination device, a destination site, or a destination subnet.

3. The apparatus of claim 1, wherein, to determine the end-to-end path PMI, the processor is configured to:
   identify the set of egress BRs associated with the source ingress PE device from a set of egress BRs of the provider core network based on use of egress peer engineering.

4. The apparatus of claim 1, wherein, to determine the end-to-end path PMI, the processor is configured to:
   initiate one or more performance measurement tests for obtaining the internal path PMI for potential internal paths between the source PE device and the respective egress BR.

5. The apparatus of claim 4, wherein, to initiate the one or more performance measurement tests, the processor is configured to:
   send one or more performance measurement test instructions toward the source ingress PE device.

6. The apparatus of claim 4, wherein the one or more performance measurement tests include at least one of a Label Switched Path (LSP) Ping test or an Internet Internet Control Message Protocol (ICMP) Ping test.

7. The apparatus of claim 1, wherein, to determine the end-to-end path PMI, the processor is configured to:
   initiate one or more performance measurement tests for obtaining the external path PMI for potential external paths between the respective egress BR and the destination.

8. The apparatus of claim 7, wherein, to initiate the one or more performance measurement tests, the processor is configured to:
   send one or more performance measurement test instructions toward the respective egress BR.

9. The apparatus of claim 7, wherein, to initiate the one or more performance measurement tests, the processor is configured to:
   initiate provisioning of a testing probe at the destination; and
   initiate the one or more performance measurement tests based on the testing probe at the destination.

10. The apparatus of claim 7, wherein, to initiate the one or more performance measurement tests, the processor is configured to:
    identify an address of the destination; and
    initiate the one or more performance measurement tests based on the address of the destination.

11. The apparatus of claim 7, wherein the one or more performance measurement tests include at least one of an Internet Control Message Protocol (ICMP) Ping test or a test using the Two-Way Interactive Measurement (TWAMP) protocol.

12. The apparatus of claim 1, wherein the processor is configured to determine the end-to-end path for the traffic flow based on a shortest path algorithm.

13. The apparatus of claim 1, wherein, to initiate programming of the provider core network to support steering of traffic of the traffic flow onto the end-to-end path for the traffic flow, the processor is configured to:
    initiate programming of the source ingress PE device with instructions to forward traffic of the traffic flow toward an egress point of the provider core network for the traffic flow.

14. The apparatus of claim 13, wherein the egress point of the provider core network for the traffic flow includes:
    one of the egress BRs;
    one of the egress BRs and an associated peer router that is associated with the one of the egress BRs; or
    one of the egress BRs, an associated peer router that is associated with the one of the egress BRs, and a peer link between the one of the egress BRs and the associated peer router that is associated with the one of the egress BRs.

15. The apparatus of claim 1, wherein the processor is configured to initiate programming of the provider core network to support steering of traffic of the traffic flow onto the end-to-end path for the traffic flow based on at least one of an OpenFlow protocol, configuration of a steering filter, configuration of a Border Gateway Protocol (BGP) Flowspec protocol, use of a programmable Application Programming Interface (API) of a Routing Information Base (RIB) or a Forwarding Information Base (FIB), or use of BGP route injection.

16. The apparatus of claim 1, wherein the end-to-end path for the traffic flow includes an identification of an egress point of the provider core network for the traffic flow.

17. The apparatus of claim 16, wherein the identification of the egress point from the provider core network for the traffic flow includes:
   an identification of one of the egress BRs;
   an identification of one of the egress BRs and an identification of an associated peer router that is associated with the one of the egress BRs; or
   an identification of one of the egress BRs, an identification of an associated peer router that is associated with the one of the egress BRs, and an identification of a peer link between the one of the egress BRs and the associated peer router that is associated with the one of the egress BRs.

18. A method configured to improve computer performance in controlling traffic steering the method comprising:
   receiving, by a processor, a request to support a traffic flow to be transported to a destination via a provider core network including a source ingress provider edge (PE) device and a set of egress border routers (BRs) associated with the source ingress PE device;
   determining, by the processor for each of the egress BRs, end-to-end path performance measurement information (PMI) including internal path PMI for potential internal paths between the source PE device and the respective egress BR and external path PMI for potential external paths between the respective egress BR and the destination;
   determining, by the processor based on the end-to-end path PMI, an end-to-end path for the traffic flow; and
   initiating, by the processor, programming of the provider core network to support steering of traffic of the traffic flow onto the end-to-end path for the traffic flow.

19. An apparatus configured to improve computer performance in supporting traffic steering, the apparatus comprising:
   a processor and a memory communicatively connected to the processor, the processor configured to:
      receive, by a source ingress provider edge (PE) device of a provider core network, a performance measurement test instruction configured to cause the source ingress PE device to initiate a performance measurement test configured to determine performance measurement information for a potential path between the source ingress PE device and an egress border router (BR) of the provider core network; and
      receive, by the source ingress PE device, traffic steering rules configured to cause the source ingress PE device to steer traffic of a traffic flow toward the egress BR.

20. An apparatus configured to improve computer performance in supporting traffic steering, the apparatus comprising:
   a processor and a memory communicatively connected to the processor, the processor configured to:
      receive, by an egress border router (BR) of a provider core network, a performance measurement test message of a first performance measurement test configured to determine performance measurement information for a path between a source ingress provider edge (PE) device of the provider core network and the egress BR; and
      receive, by the egress BR, a performance measurement test instruction configured to cause the egress BR to initiate a second performance measurement test configured to determine performance measurement information for a path between the egress BR and a destination reachable from the provider core network via the egress BR.

21. An apparatus configured to improve computer performance in supporting traffic steering, the apparatus comprising:
   a processor and a memory communicatively connected to the processor, the processor configured to:
      receive, by a destination reachable from a provider core network via an egress border router (BR) of the provider core network, a performance measurement test instruction configured to cause the destination to create a testing probe; and
      receive, by the destination from the egress BR based on the testing probe, a performance measurement test message of a performance measurement test configured to determine performance measurement information for a path between the egress BR and the destination.

* * * * *